May 6, 1958 B. H. TONGUE 2,833,924
AMPLITUDE-STABILIZED OSCILLATING CIRCUIT
Filed Nov. 13, 1956
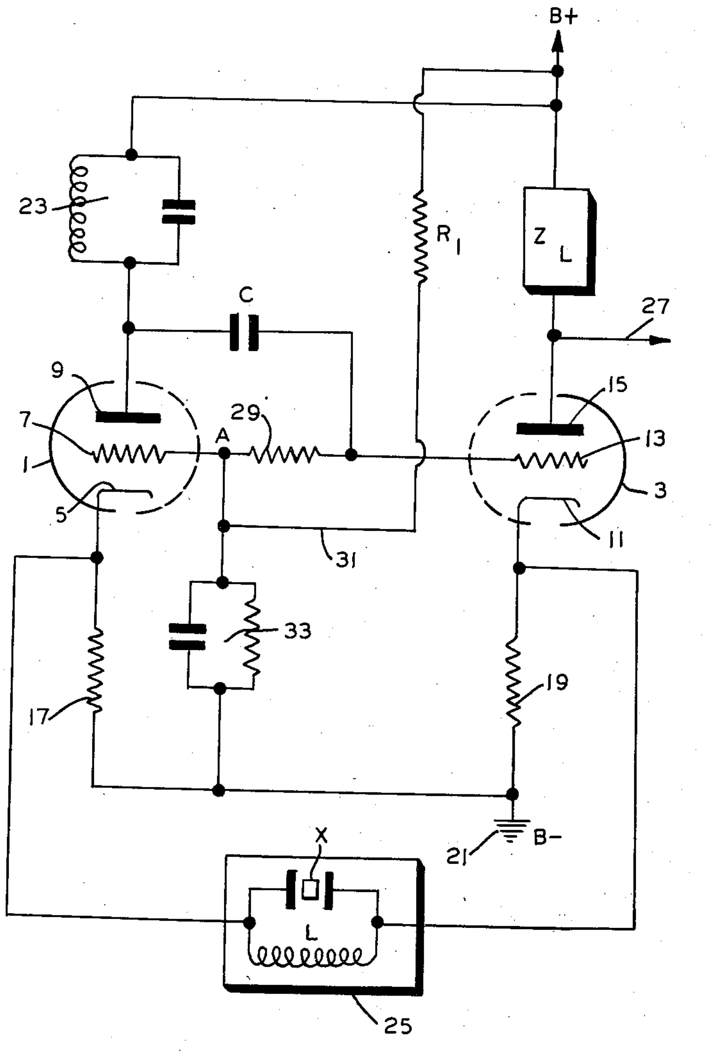
INVENTOR.
BEN H. TONGUE
BY Rines and Rines
ATTORNEYS 2,833,924

AMPLITUDE-STABILIZED OSCILLATING CIRCUIT

Ben H. Tongue, West Orange, N. J.

Application November 13, 1956, Serial No. 621,564
16 Claims. (Cl. 250—36)

The present invention relates to oscillators, and, more particularly, to circuits adapted to generate harmonics of an oscillation frequency.

Tuned oscillator circuits, including those operating under the control of frequency-determining elements, such as piezoelectric crystals or other electromechanical vibrators, are frequently used to generate high frequencies that are harmonically related to the fundamental frequency of the frequency-determining elements. If an oscillator circuit is adapted to generate harmonics, it is desirable to generate the harmonics when the oscillator is operating near maximum allowable dissipation of the crystal or other tuned-circuit elements. If weak tubes of low transconductance are present in the circuit, though, the circuit may either not oscillate at all or negligible harmonic generation will be produced. The circuit must thus be adjusted to insure oscillation and substantial harmonic generation with such weak tubes. Upon the substitution of a strong tube of high transconductance, the crystal or other tuned circuit will then be found, however, to be overdissipated in the circuit.

Various amplitude-level stabilization circuits have been evolved, of course, to try to maintain the oscillation amplitude level substantially constant. As an illustration, in oscillator circuits employing a pair of electron tubes or other amplifiers and operating with a tuned circuit coupling the cathode electrodes (or electrodes equivalent thereto), there is usually employed grid-leak-resistance amplitude stabilization in accordance with which the grid of one of the pair of electron tubes is returned to the ground or negative terminal of the plate supply source. The stabilization of the level of amplitude of operation, however, is not effective enough in such circuits to overcome the above-described difficulties attendant upon the use of both weak and strong electron tubes, particularly if the operation is to be effected over wide ranges of transconductance variation in the tubes that are employed.

An object of the present invention, accordingly, is to provide a new and improved oscillator circuit that is particularly adapted for the generation of harmonics and that shall not be subject to the above-described disadvantages; but, to the contrary, provides for operation near the maximum allowable dissipation of the tuned circuit elements irrespective of the use of weak or strong electron tubes.

A further object is to provide a new and improved oscillator.

Still an additional object is to provide a new and improved amplitude-stabilized oscillator.

Other and further objects will be explained hereinafter and will be more particularly pointed out in the appended claims.

In summary, the present invention contemplates a cathode coupled oscillator circuit comprising a pair of electron tubes, each having cathode, grid and anode electrodes. Tuned circuit means is coupled between the cathode electrode and a feed-back connection is provided from the anode electrode of one of the tubes to the grid electrode of the other tube. In accordance with the present invention, the grid-leak resistance is connected not to the ground or B— terminal, but, rather, between the grid electrodes of the pair of electron tubes. The grid electrode of the said one tube, moreover, is connected to a source of positive potential, preferably the B+ supply, and resistance is disposed in that connection of value sufficient to permit oscillation in the circuit with high dissipation in the tuned circuit means when electron tubes of maximum transconductance are employed. Under such circumstances, the grid electrode of the said one tube may oscillate with slightly negative bias. The grid electrode of the said one tube, moreover, will then oscillate at more positive bias when weaker electron tubes are substituted for the tubes of maximum transconductance in the said circuit, tending to control the voltage at the grid electrode of the said other tube, through the said feed-back connection, at substantially the same amplitude level as when the said electron tubes of maximum transconductance are employed.

The invention will now be described in detail in connection with the accompanying drawing, the single figure of which is a schematic circuit diagram representing the invention in preferred form.

A cathode-coupled oscillator circuit is there shown comprising a pair of electron-tube amplifiers 1 and 3 which may, if desired, constitute separate sections of a single-envelope double electron tube. For purposes of illustration, the tubes 1 and 3 are shown as of the triode variety although the present invention is equally adaptable to circuits employing other types of electron tubes and amplifiers. The tube 1 is provided with a cathode electrode 5, a control-grid electrode 7 and a plate or anode electrode 9. The electron tube 3 is similarly provided with a cathode electrode 11, a control-grid electrode 13 and a plate or anode electrode 15. The cathodes 5 and 11 of the pair of electron tubes 1 and 3 are connected through respective cathode resistors 17 and 19, preferably of similar relatively low impedance (say, of the order of 270 ohms, more or less) to the negative terminal B— of the anode-to-cathode potential supply-voltage source B+, B—. The negative terminal B— may, if desired, be grounded, as illustrated at 21. The term "ground" is intended to connote not only actual earthing, but also chassis or other reference potential.

Connected to the anode 9 of the electron tube 1 is a resonant circuit 23 of any desired type such as a parallel-connected inductor and capacitor. Connected between the cathode electrodes 5 and 11 of the electron tubes 1 and 3 is a further tuned-circuit means 25 which, for purposes of illustration, is shown in the preferred form of a piezoelectric crystal X, shunted by an inductance L which may be employed to neutralize the capacitance inherent in the holder containing the crystal device X and the shunt capacitance of the crystal. Other types of frequency-determining tuned-circuit elements 25 may, of course, be utilized. In the illustrated example, the before-mentioned resonant circuit 23 may be tuned to the frequency of the crystal X. Connected to the plate or anode 15 of the second electron tube 3 is a load $Z_L$, which may be a resonant circuit tuned to the desired harmonic of the crystal frequency, and from the lower terminal of which the output of the circuit may be extracted, as by means of the conductor 27. The anode or plate electrodes 9 and 15 of the electron tubes 1 and 3 are supplied with positive potential from the B+ terminal of anode-to-cathode voltage supply source through the coil of the resonant circuit 23 and through the load $Z_L$, respectively.

In customary circuits of the above-described character, the control electrode 13 of the tube 3 would normally be returned through a grid-leak resistor 29 to the B— terminal 21 of the negative power supply. As before stated, this grid-leak resistor serves to effect a type of amplitude level stabilization as a result of the drawing of grid current which tends to compensate somewhat for operational changes in the transconductance of the tubes 1 and 3. As previously explained, however, such stabilization of the amplitude level is not strict enough where the operation may involve wide ranges of variation in the transconductance of different tubes 1 and 3. It has been discovered, however, that if certain important circuit changes are effected, the above-described disadvantages may be overcome and much better amplitude stabilization may be effected over wide ranges of variation of the tube transconductance. Those changes involve, first, interconnecting the control-grid electrodes 7 and 13 of the tubes 1 and 3 with the grid-leak resistor 29, instead of returning the control-grid electrode 13 through the resistor 29 to ground. Secondly, connecting the control-grid electrode 7 by conductor 31 to a source of positive potential, preferably the terminal B+, through resistance $R_1$. The value of $R_1$, however, must be properly determined to produce the phenomenon of the present invention, as later explained. The control-grid electrode 7, moreover, is returned to the negative terminal 21 by the shunt-connected combination of a resistor and by-pass capacitor or condenser 33. The capacitor of the circuit 33 grounds the control-grid electrode 7 of the stage 1 signal-wise, and the resistor serves to limit the voltage applied to the control-grid electrodes 7 and 13 of the grounded-grid stage 1 and the cathode follower stage 3, respectively, when the apparatus is initially supplied with plate voltage and the cathodes 5 and 11 have not yet become well heated.

In accordance with the invention, tubes 1 and 3 representative of the strongest tubes to be used with the circuit (i. e. tubes of greatest transconductance) are first inserted into the circuit. The value of the resistance $R_1$ is then adjusted so that the circuit oscillates at substantially maximum dissipation of the tuned circuit 25. Under such circumstances, the control-grid electrode 13 of the tube 1 will operate several volts negative, so that the transconductance of the tube 1 is reduced. Advantage is thus taken of one of the controlling factors of the degree of amplitude stabilization; namely, the degree of variation of transconductance of the tube for a given grid bias change. When, therefore, a weaker tube is employed in the circuit, the oscillation circuit tends to oscillate to a less degree. This results in providing a less negative bias at the control-grid electrode 13 of the tube 3 which then acts somewhat as a detector of the oscillation level. The result of this operation is to render more positive the voltage on the control-grid electrode 7 of the tube 1 since it is connected to the control-grid electrode 13 of the tube 3. This action reduces the voltage at the anode or plate 9 and, through the feed-back condenser C connected between the plate 9 of the tube 1 and the control-grid electrode 13 of the tube 3, reduces the control-grid operating bias at the control-grid electrode 13 to a level comparable to that which it had attained when a strong or maximum transconductance tube 3 was employed.

The point A at the control electrode 7 of the tube 1 is thus maintained at slightly negative potential even though it is not directly connected to the negative B— terminal of the anode-to-cathode potential source. In effect, current is supplied through the resistor $R_1$ from the B+ terminal, such that substantial current equality is attainted with the current drawn through the grid-leak resistor 29 from the tube 3, holding the point A at slightly negative potential. The degree or level of stabilization is thus controlled over wide ranges of transconductance of the tubes 1 and 3. This means that irrespective of whether strong or weak tubes are placed in the circuit, the circuit will still oscillate near the maximum allowable dissipation of the crystal X, thus insuredly producing harmonics of useful amplitude, as contrasted with prior-art circuits of this character in which the insertion of weak tubes gives rise to the loss of appreciable harmonic generation.

As an illustration of typical circuit values, the grid-leak resistor 29 may have a value of, for example, approximately 15,000 ohms. The control-grid 13 of the tube 3 may be operated normally at approximately —7.5 volts when a B+ voltage of the order of 150 volts is employed. The resistor of the RC network 33 must have a value very large compared to that of the grid-leak resistor 29; for example, of the order of 150,000 ohms. The resistor $R_1$ in the connection 31 to the B+ supply should also be of value high compared with the grid-leak resistor 29. In the commercial adaptation of this circuit, moreover, the resistor $R_1$ is preferably high compared with the value of the resistor of the network 33. Resistor $R_1$ may, for example, have a value of 350,000 ohms, more or less. Under such circumstances, the circuit operates, as before described, with stabilized amplitude of oscillation over very wide ranges in transconductance of various electron tubes 1 and 3.

Modifications will occur to those skilled in the art and all such are considered to fall within the spirit and scope of the invention, as defined in the appended claims.

What is claimed is:

1. In a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, grid-leak resistance connected between the grid electrodes, means for connecting the grid electrode of the said one tube to a source of positive potential, and resistance disposed in the said connecting means of value sufficient to permit oscillation in the circuit with high dissipation in the tuned-circuit means when electron tubes of maximum transconductance are employed, in order that the grid electrode of the said one tube may operate with slightly negative bias, whereby the grid eelctrode of the said one tube will operate at more positive bias when weaker electron tubes are employed in the said circuit, tending to control the voltage at the grid electrode of the said other tube, through the said feed-back connection, at substantially the same amplitude level as when the said electron tubes of maximum transconductance are employed.

2. In a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, grid-leak resistance connected between the grid electrodes, a shunt-connected resistance-capacitance circuit disposed between the grid electrode of the said one tube and the negative terminal of an anode-to-cathode potential source, means for connecting the said grid electrode of the said one tube to the positive terminal of the said potential source, and resistance disposed in the said connecting means of value sufficient to permit oscillation in the circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said circuit, tending to control the voltage at the grid electrode of the said other tube, through the said feed-back connection, at substantially the same amplitude level as when the said electron tubes of maximum transconductance are employed.

3. In a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, grid-leak resistance connected between the grid electrodes, a shunt-connected resistance-capacitance circuit disposed between the grid electrode of the said one tube and the negative terminal of an anode-to-cathode potential source and the resistance of which is much larger than that of the said grid-leak resistance, means for connecting the said grid electrode of the said one tube to the positive terminal of the said potential source, and resistance of value much larger than the said grid-leak resistance disposed in the said connecting means of value sufficient to permit oscillation in the circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said circuit, tending to control the voltage at the grid electrode of the said other tube, through the said feed-back connection, at substantially the same amplitude level as when the said electron tubes of maximum transconductance are employed.

4. In a cathode-coupled oscillator circuit comprising a pair of electron tubes each having cathode, grid and anode electrodes, a piezo-electric crystal coupled between the cathode electrodes, a feed-back connection from the anode electrode of one of the tubes to the grid electrode of the other tube, grid-leak resistance connected between the grid electrodes, means for connecting the grid electrode of the said one tube to a source of positive potential, and resistance disposed in the said connecting means of value sufficient to permit oscillation in the circuit with high dissipation in the piezo-electric crystal when electron tubes of maximum transconductance are employed, in order that the grid electrode of the said one tube may operate with slightly negative bias, whereby the grid electrode of the said one tube will operate at more positive bias when weaker electron tubes are employed in the said circuit, tending to control the voltage at the grid electrode of the said other tube, through the said feed-back connection, at substantially the same amplitude level as when the said electron tubes of maximum transconductance are employed.

5. In a cathode-coupled oscillator circuit comprising a pair of electron tubes each having cathode, grid and anode electrodes, a piezo-electric crystal coupled between the cathode electrodes, a feed-back connection from the anode electrode of one of the tubes to the grid electrode of the other tube, grid-leak resistance connected between the grid electrodes, a shunt-connected resistance-capacitance circuit disposed between the grid electrode of the said one tube and the negative terminal of an anode-to-cathode potential source, means for connecting the said grid electrode of the said one tube to the positive terminal of the said potential source, and resistance disposed in the said connecting means of value sufficient to permit oscillation in the circuit with high dissipation in the piezo-electric crystal when electron tubes of maximum transconductance are employed, in order that the grid electrode of the said one tube may operate with slightly negative bias, whereby the grid electrode of the said one tube will operate at more positive bias when weaker electron tubes are employed in the said circuit, tending to control the voltage at the grid electrode of the said other tube, through the said feed-back connection, at substantially the same amplitude level as when the said electron tubes of maximum transconductance are employed.

6. In a cathode-coupled oscillator circuit comprising a pair of electron tubes each having cathode, grid and anode electrodes, a piezoelectric crystal coupled between the cathode electrodes, a feed-back connection from the anode electrode of one of the tubes to the grid electrode of the other tube, grid-leak resistance connected between the grid electrodes, a shunt-connected resistance-capacitance circuit disposed between the grid electrode of the said one tube and the negative terminal of an anode-to-cathode potential source and the resistance of which is much larger than that of the said grid-leak resistance, means for connecting the said grid electrode of the said one tube to the positive terminal of the said potential source, and resistance of value much larger than the said grid-leak resistance disposed in the said connecting means of value sufficient to permit oscillation in the circuit with high dissipation in the piezo-electric crystal when electron tubes of maximum transconductance are employed, in order that the grid electrode of the said one tube may operate with slightly negative bias, whereby the grid electrode of the said one tube will operate at more positive bias when weaker electron tubes are employed in the said circuit, tending to control the voltage at the grid electrode of the said other tube, through the said feed-back connection, at substantially the same amplitude level as when the said electron tubes of maximum transconductance are employed.

7. In an harmonic generator, a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, a resonant circuit tuned to an harmonic of the frequency of the tuned-circuit means and connected to one of the anode electrodes, grid-leak resistance connected between the grid electrodes, means for connecting the grid electrode of the said one tube to a source of positive potential, and resistance disposed in the said connecting means of value sufficient to permit oscillation in the oscillator circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

8. In an harmonic generator, a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, a resonant circuit tuned to an harmonic of the frequency of the tuned-circuit means and connected to one of the anode electrodes, grid-leak resistance connected between the grid electrodes, a shunt-connected resistance-capacitance circuit disposed between the grid electrode of the said one tube and the negative terminal of an anode-to-cathode potential source, means for connecting the said grid electrode of the said one tube to the positive terminal of the said potential source, and resistance disposed in the said connecting means of value sufficient to permit oscillation in the oscillator circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

9. In an harmonic generator, a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, a resonant circuit tuned to an harmonic of the frequency of the tuned-circuit means and connected to one of the anode electrodes, grid-leak resistance connected between the grid electrodes, a shunt-connected resistance-capacitance circuit disposed between the grid electrode of the said one tube and the negative terminal of an anode-to-cathode potential source and the resistance of which is much larger than that of the said grid-leak resistance, means for connecting the said grid electrode of the said one tube to the positive terminal of the said potential source, and resistance of value much larger than the said grid-leak resistance disposed in the said connecting means of value sufficient to permit oscillation in the oscillator circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

10. In an harmonic generator, a cathode-coupled oscillator circuit comprising a pair of electron tubes each having cathode, grid and anode electrodes, a piezoelectric crystal coupled between the cathode electrodes, a feed-back connection from the anode electrode of one of the tubes to the grid electrode of the other tube, a resonant circuit tuned to an harmonic of the frequency of the piezoelectric crystal and connected to one of the anode electrodes, grid-leak resistance connected between the grid electrodes, means for connecting the grid electrode of the said one tube to a source of positive potential, and resistance disposed in the said connecting means of value sufficient to permit oscillation in the oscillator circuit with high dissipation in the piezoelectric crystal when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

11. In an harmonic generator, a cathode-coupled oscillator circuit comprising a pair of electron tubes each having cathode, grid and anode electrodes, a piezoelectric crystal coupled between the cathode electrodes, a feed-back connection from the anode electrode of one of the tubes to the grid electrode of the other tube, a resonant circuit tuned to an harmonic of the frequency of the piezoelectric crystal and connected to one of the anode electrodes, grid-leak resistance connected between the grid electrodes, a shunt-connected resistance-capacitance circuit disposed between the grid electrode of the said one tube and the negative terminal of an anode-to-cathode potential source, means for connecting the said grid electrode of the said one tube to the positive terminal of the said potential source, and resistance disposed in the said connecting means of value sufficient to permit oscillation in the oscillator circuit with high dissipation in the piezoelectric crystal when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

12. In an harmonic generator, a cathode-coupled oscillator circuit comprising a pair of electron tubes each having cathode, grid and anode electrodes, a piezoelectric crystal coupled between the cathode electrodes, a feed-back connection from the anode electrode of one of the tubes to the grid electrode of the other tube, a resonant circuit tuned to an harmonic of the frequency of the piezoelectric crystal and connected to one of the anode electrodes, grid-leak resistance connected between the grid electrodes, a shunt-connected resistance-capacitance circuit disposed between the grid electrode of the said one tube and the negative terminal of an anode-to-cathode potential source and the resistance of which is much larger than that of the said grid-leak resistance, means for connecting the said grid electrode of the said one tube to the positive terminal of the said potential source, and resistance of value much larger than the said grid-leak resistance disposed in the said connecting means of value sufficient to permit oscillation in the oscillator circuit with high dissipation in the piezoelectric crystal when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

13. In an harmonic generator, a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, a pair of resonant circuits respectively tuned to the fundamental and an harmonic of the frequency of the tuned-circuit means and respectively connected to the anode electrodes of the said one tube and the other of the pair of tubes, grid-leak resistance connected between the grid electrodes, means for connecting the grid electrode of the said one tube to a source of positive potential, and resistance disposed in the said connecting means of value sufficient to permit oscillation in the oscillator circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

14. In an harmonic generator, a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, a pair of resonant circuits respectively tuned to the fundamental and an harmonic of the frequency of the tuned-circuit means and respectively connected to the anode electrodes of the said one tube and the other of the pair of tubes, grid-leak resistance connected between the grid electrodes, a shunt-connected resistance-capacitance circuit disposed between the grid electrode of the said one tube and the negative terminal of an anode-to-cathode potential source, means for connecting the said grid electrode of the said one tube to the positive terminal of the said potential source, and resistance disposed in the said connecting means of value sufficient to permit oscillation in the oscillator circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

15. In an harmonic generator, a cathode-coupled oscillator circuit comprising a pair of electron tubes each having cathode, grid and anode electrodes, tuned-circuit means coupled between the cathode electrodes, a feed-back connection from the anode electrode of one of the tubes to the grid electrode of the other tube, a pair of resonant circuits respectively tuned to the fundamental and an harmonic of the frequency of the tuned-circuit means and respectively connected to the anode electrodes of the said one tube and the other of the pair of tubes, grid-leak resistance connected between the grid electrodes, a shunt-connected resistance-capacitance circuit disposed between the grid electrode of the said one tube and the negative terminal of an anode-to-cathode potential source and the resistance of which is much larger than that of the said grid-leak resistance, means for connecting the said grid electrode of the said one tube to the positive terminal of the said potential source, and resistance of value much larger than the said grid-leak resistance disposed in the said connecting means of value sufficient to permit oscillation in the oscillator circuit with high dissipation in the tuned-circuit means when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

16. In an harmonic generator, a cathode-coupled oscillator circuit comprising a pair of electron tubes each having cathode, grid and anode electrodes, a piezoelectric crystal coupled between the cathode electrodes, a feed-back connection from the anode electrode of one of the tubes to the grid electrode of the other tube, a pair of resonant circuits tuned respectively to the fundamental and an harmonic of the frequency of the piezoelectric crystal and respectively connected to the anode electrodes of the said one tube and the other of the pair of tubes, grid-leak resistance connected between the grid electrodes, means for connecting the grid electrode of the said one tube to a source of positive potential, and resistance disposed in the said connecting means of value sufficient to permit oscillation in the oscillator circuit with high dissipation in the piezoelectric crystal when electron tubes of maximum transconductance are employed, in order that the grid electrode of the said one tube may operate with slightly negative bias, whereby the grid electrode of the said one tube will operate at more positive bias when weaker electron tubes are employed in the said oscillator circuit, tending to control the voltage at the grid electrode of the said other tube, through the said feed-back connection, at substantially the same amplitude level as when the said electron tubes of maximum transconductance are employed.

References Cited in the file of this patent

UNITED STATES PATENTS

| | | |
|---|---|---|
| 2,559,388 | Baldridge | July 3, 1951 |
| 2,562,311 | Goldberg | July 31, 1951 |
| 2,792,498 | Pewitt | May 14, 1957 |